United States Patent
Greiner et al.

(10) Patent No.: US 9,310,535 B1
(45) Date of Patent: Apr. 12, 2016

(54) THERMALLY COMPENSATED OPTICAL DIFFRACTION GRATINGS

(71) Applicant: LightSmyth Technologies Inc, Eugene, OR (US)

(72) Inventors: Christoph M. Greiner, Eugene, OR (US); Thomas W. Mossberg, Eugene, OR (US); Dmitri Iazikov, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 335 days.

(21) Appl. No.: 13/947,053

(22) Filed: Jul. 20, 2013

Related U.S. Application Data

(62) Division of application No. 12/876,086, filed on Sep. 3, 2010, now abandoned.

(60) Provisional application No. 61/239,708, filed on Sep. 3, 2009.

(51) Int. Cl.
*G02B 5/18* (2006.01)
*G02B 27/42* (2006.01)

(52) U.S. Cl.
CPC ............ *G02B 5/1861* (2013.01); *G02B 5/1847* (2013.01); *G02B 5/1814* (2013.01); *G02B 27/4283* (2013.01)

(58) Field of Classification Search
CPC ...... G02B 5/18; G02B 5/1814; G02B 5/1861; G02B 27/42; G02B 27/4233; G02B 27/4244; G02B 27/425; G02B 27/4266; G02B 27/4283; G02B 27/4288; G02B 27/94; G02B 27/44
USPC ......... 359/569, 558, 566, 570, 571, 572, 574, 359/576
See application file for complete search history.

(56) References Cited

U.S. PATENT DOCUMENTS

| | | | |
|---|---|---|---|
| 6,965,475 B2 | 11/2005 | Shiozaki et al. | |
| 7,630,599 B2 * | 12/2009 | McLaughlin | G02B 6/29398 385/18 |
| 2010/0208262 A1 * | 8/2010 | Yoshida | G01J 3/02 356/328 |

OTHER PUBLICATIONS

U.S. Appl. No. 12/876,086, filed Sep. 3, 2010, Greiner et al.
Office Action dated Mar. 21, 2013 in parent U.S. Appl. No. 12/876,086.

* cited by examiner

*Primary Examiner* — Arnel C Lavarias
(74) *Attorney, Agent, or Firm* — David S. Alavi

(57) ABSTRACT

An optical diffraction grating includes a substantially transparent grating substrate which has substantially flat first and second surfaces, and a set of grating lines on the first surface characterized by a grating spacing $\Lambda$. The grating substrate has a temperature-dependent refractive index $n_{sub}$ and is immersed in a medium having a temperature-dependent refractive index $n_{med}$. The first and second substrate surfaces are non-parallel and form a dihedral angle $\alpha$. The gratings lines are substantially perpendicular to a plane of incidence defined by surface-normal vectors of the first and second surfaces. Variation of a diffraction angle $\theta_{d'}$ with temperature, exhibited by the optical diffraction grating at a design wavelength $\lambda$ and at a design incidence angle $\theta_{in}$ in the plane of incidence, is less than that variation exhibited by a reference diffraction grating that has parallel first and second substrate surfaces but is otherwise identical to the optical diffraction grating.

18 Claims, 6 Drawing Sheets

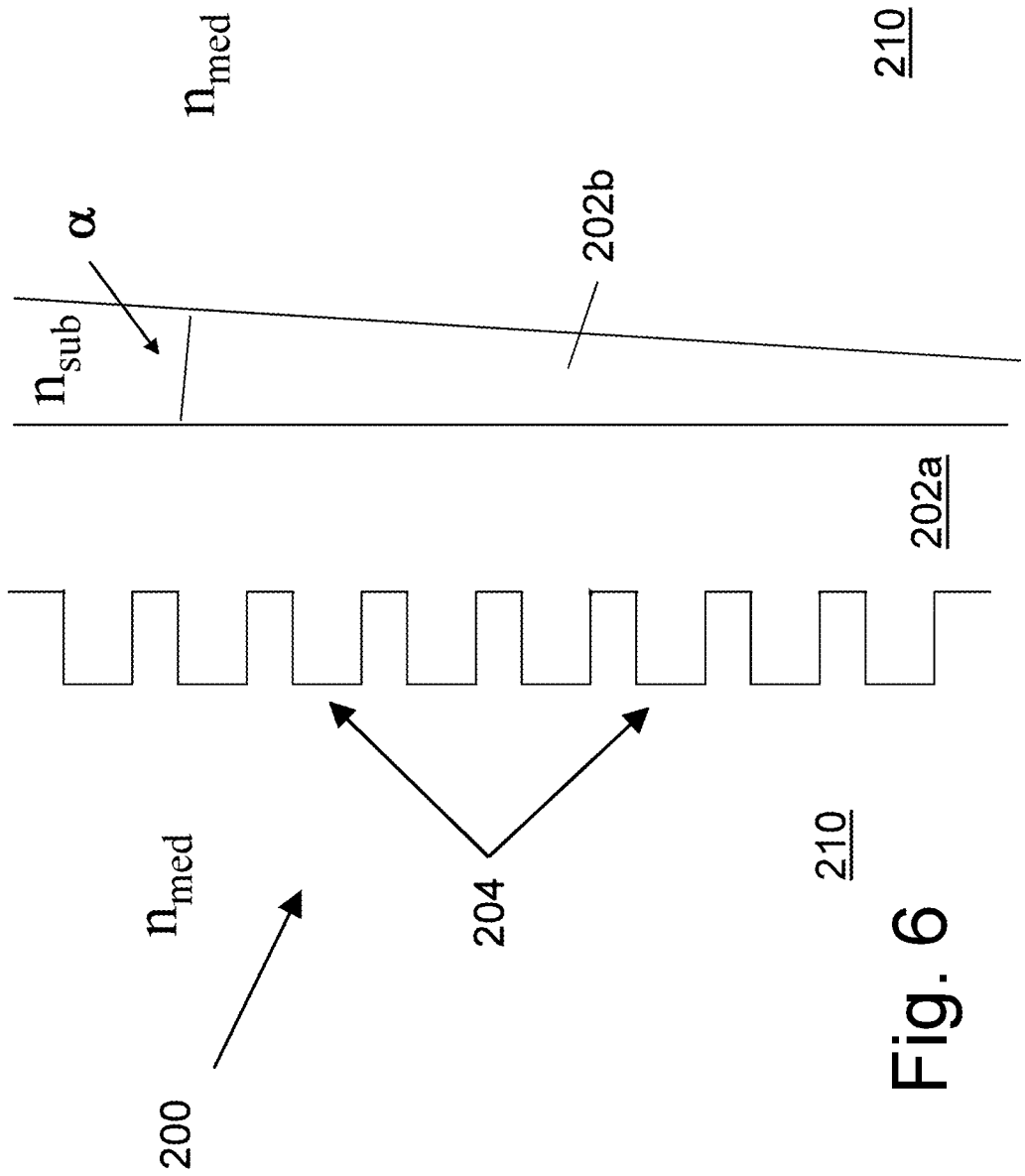

THERMALLY COMPENSATED OPTICAL DIFFRACTION GRATINGS

BENEFIT CLAIMS TO RELATED APPLICATIONS

This application is a divisional of U.S. non-provisional application Ser. No. 12/876,086 entitled "Thermally compensated optical diffraction gratings" and filed Sep. 3, 2010 in the names of Christoph M. Greiner, Thomas W. Mossberg, and Dmitri Iazikov, which in turn claims benefit of U.S. provisional App. No. 61/239,708 entitled "Thermally stabilized highly efficient transmission gratings" and filed Sep. 3, 2009 in the names of Christoph M. Greiner, Thomas W. Mossberg, and Dmitri Iazikov, both of said applications being hereby incorporated by reference as if fully set forth herein.

BACKGROUND

The field of the present invention relates to optical diffraction gratings. In particular, apparatus and methods are disclosed that include thermally compensated optical diffraction gratings, including both transmission gratings and reflection gratings.

A variety of undesirable or adverse operating characteristics of diffraction gratings arise when they are deployed in environments wherein temperature is not a constant. Many diffraction grating performance parameters, e.g., diffraction efficiency, diffraction angle of a given wavelength, or polarization-dependent diffraction efficiency, exhibit temperature dependence. Such temperature dependence can result in grating performance outside an operationally acceptable range. Temperature changes in the grating's use environment can affect grating performance parameters through temperature-induced changes of the refractive index of the surrounding medium or grating substrate, or through thermal expansion or contraction of the grating substrate material, or through variation of other parameters.

A conventional optical transmission grating 100 is illustrated schematically in FIG. 1. The grating 100 comprises a substrate 102 and a set of grating lines 104. The substrate 102 is substantially transparent over an operational wavelength range, has a temperature-dependent refractive index $n_{sub}$, and has substantially flat, substantially parallel first and second surfaces. The grating is immersed in a substantially transparent ambient medium 110 having a temperature-dependent refractive index $n_{med}$ (air in the example, with temperature-dependent refractive index $n_{med}=n_{Air}$; other substantially transparent solid, liquid, or gaseous media can be employed). A cross section of the grating 100 is shown in FIG. 1, in which the grating is viewed in a direction parallel to the grating lines 104 and perpendicular to a plane of incidence defined by a surface normal vector and an incident wavevector $k_{in}$. The set of grating lines 104 in the illustrated example are a set of parallel grooves etched into a first surface of the substrate 102 and evenly spaced by a grating period $\Lambda$ (equivalently, the grating lines can be viewed as the set of parallel ridges protruding between the grooves). The grating period $\Lambda$ is sometimes comparable to or shorter than the wavelength $\lambda$ of an incident optical signal (e.g., between about 800 nm and about 2000 nm), so that only one diffracted order is present, as in the example shown. However, any suitable grating spacing can be employed, resulting in a corresponding number of one or more diffracted orders.

In the example shown, the grating lines comprise grooves etched in the substrate (or the ridges between them), and those grooves/ridges are shown as substantially rectangular in cross section. However, any suitable cross-sectional shape for grooves or ridges can be employed for the grating lines, e.g., rectangular, trapezoidal, sawtooth, triangular, blazed, or sinusoidal. Each grating line can itself comprise a set of multiple grooves, ridges, or other features. In the example shown, the grating teeth (i.e., the ridges protruding between the etched grooves) comprise the same material as the substrate 102. However, grating lines can be implemented by forming the grating teeth from a material differing from the substrate material. Alternatively, the grating lines need not comprise any deviation from a flat grating surface at all, but can instead comprise any suitable periodic index modulation of the substrate or one or more layers on the substrate, made by altering substrate or layer material or by applying or depositing differing material. Apparatus and methods disclosed herein are applicable regardless of the manner in which the grating lines are formed in or on the substrate.

In FIG. 1, an optical signal with wave vector $k_{in}$ is incident on the transmission grating 100 with incidence angle $\theta_{in}$ (with respect to a grating surface normal vector). The transmission grating 100 diffracts a transmitted portion of that incident signal as a diffracted signal (negative first order), which exits the transmission grating substrate 102 with wavevector $k_{t-1}$ at diffraction angle $\theta_d$. In FIG. 1, zeroth order signals (i.e., specularly reflected and directly transmitted waves), any other transmitted diffracted orders, and any reflected diffracted orders are omitted for clarity.

The diffraction angle $\theta_d$ of the incident signal with incidence angle $\theta_{in}$ and wavelength $\lambda$ is given by Eq. 1:

$$\sin\theta_{in}+\sin\theta_d=\lambda/(\Lambda\cdot n_{Air}). \qquad (1)$$

The temperature dependence of the grating period $\Lambda$ and of the refractive index of air are given approximately by Eqs. 2 and 3:

$$\Lambda(T)\approx\Lambda(T_0)\cdot(1+(dL/dT)\cdot(T-T_0)/L) \text{ and} \qquad (2)$$

$$n_{Air}(T)\approx n_{Air}(T_0)+(dn_{Air}/dT)\cdot(T-T_0), \qquad (3)$$

where $(dL/dT)/L$ is the thermal expansion coefficient of the substrate and $dn_{Air}/dT$ is the thermo-optic coefficient of air. As seen clearly from Eq. 1, $\theta_d$ is a function of temperature by virtue of the temperature dependences of the grating period and the ambient medium's refractive index. FIG. 2 shows $\theta_d(T)$ over an operational temperature range of −5° C. to 65° C. for: $\Lambda(T_0=25°\text{ C.})=1063.75$ nm (940 lines/mm); $\lambda=1545$ nm; =46.5°; a fused silica substrate (i.e., $(dL/dT)/L=4.5\times 10^{-7}$); $n_{Air}(T_0=25°\text{ C.})=1.0003$; and $dn_{Air}/dT=-0.85\times 10^{-6}$. As can be seen in FIG. 2, the diffraction angle $\theta_d$ increases with increasing temperature, with a slope of about 0.00005° per ° C. (i.e., about $5\times 10^{-5}$ angular degrees per degree Celsius).

The variation of the diffraction angle $\theta_d$ with temperature is given more generally by Eq. 4:

$$\frac{d\theta_d}{dT} = \frac{-\lambda}{n_{med}\Lambda\cos\theta_d}\left(\frac{1}{\Lambda}\frac{d\Lambda}{dT}+\frac{1}{n_{med}}\frac{dn_{med}}{dT}\right) \qquad (4)$$

$$= \frac{-\lambda}{n_{med}\Lambda\cos\theta_d}\left(CTE_{sub}+\frac{1}{n_{med}}TOC_{med}\right)$$

where $CTE_{sub}$ is the coefficient of thermal expansion of the substrate and $TOC_{med}$ is the thermo-optic coefficient of the ambient medium. Similar equations can be derived for other diffracted orders (transmitted or reflected).

Looking more closely at the relative influence on the diffraction angle $\theta_d$ of the two temperature-dependent quantities, air refractive index and grating period, the following is observed (at least for the example of a fused silica substrate in air). With increasing temperature, the grating period Λ increases due to the positive coefficient of thermal expansion (CTE) of the substrate material. Eq. 1 therefore implies that the diffraction angle $\theta_d$ would decrease in the absence of any temperature-dependent change of the refractive index of the ambient medium. But the refractive index of the ambient medium decreases with temperature due to the negative thermo-optic coefficient (TOC) of the ambient medium. Eq. 1 therefore implies that the diffraction angle $\theta_d$ would increase in the absence of any temperature-dependent substrate expansion. In this example (fused silica in air), the second effect outweighs the first, resulting in a diffraction angle $\theta_d$ that increases with temperature, as seen in FIG. 2. The temperature dependence of the substrate refractive index $n_{sub}$ does not influence the diffraction angle $\theta_d$ for the grating 100 having parallel first and second surfaces, as is the case in the example of FIGS. 1 and 2.

It should be noted that Eqs. 1-4 apply to an optical diffraction grating as shown in FIG. 1 whether it is used in transmission (as shown) or in reflection, and for either of those cases whether the incident optical signal is first incident on the surface having the grating lines (as shown) or on the other surface. In all of those cases, parallel first and second substrate surfaces result in no dependence of the diffraction angle on the substrate index $n_{sub}$, and all of those gratings exhibit temperature-dependent diffractive behavior according to Eqs. 1-4.

It would be desirable to provide an optical diffraction grating exhibiting reduced temperature dependence of grating performance, including the diffraction angle $\theta_d$.

SUMMARY

An optical diffraction grating comprises a grating substrate and a set of grating lines formed in or on the grating substrate that are substantially parallel to a first surface of the substrate. The grating substrate has substantially flat first and second surfaces, and is substantially transparent over an operational wavelength range that includes a design wavelength λ. The grating substrate has a temperature-dependent refractive index $n_{sub}$ and is immersed in a medium having a temperature-dependent refractive index $n_{med}$. The set of grating lines is characterized by a grating spacing Λ. The first and second substrate surfaces are non-parallel and form a dihedral angle α. The gratings lines are substantially perpendicular to a plane of incidence defined by surface-normal vectors of the first and second substrate surfaces. Variation of a diffraction angle $\theta_d$, with temperature, exhibited by the optical diffraction grating at the design wavelength λ and at a design incidence angle $\theta_{in}$ in the plane of incidence, is less than that variation exhibited by a reference diffraction grating that has parallel first and second substrate surfaces but is otherwise identical to the optical diffraction grating.

A method comprises forming the grating substrate and forming the set of grating lines in or on the grating substrate. Another method comprises directing an input optical signal onto the optical diffraction grating at an input incidence angle so that a portion of the input optical signal is diffracted as an output optical signal at an output diffraction angle.

Objects and advantages pertaining to optical diffraction gratings may become apparent upon referring to the exemplary embodiments illustrated in the drawings and disclosed in the following written description or appended claims.

BRIEF DESCRIPTION OF THE DRAWINGS

FIG. 6 illustrates schematically assembly of substrate members to form a grating substrate.

Figure 1:
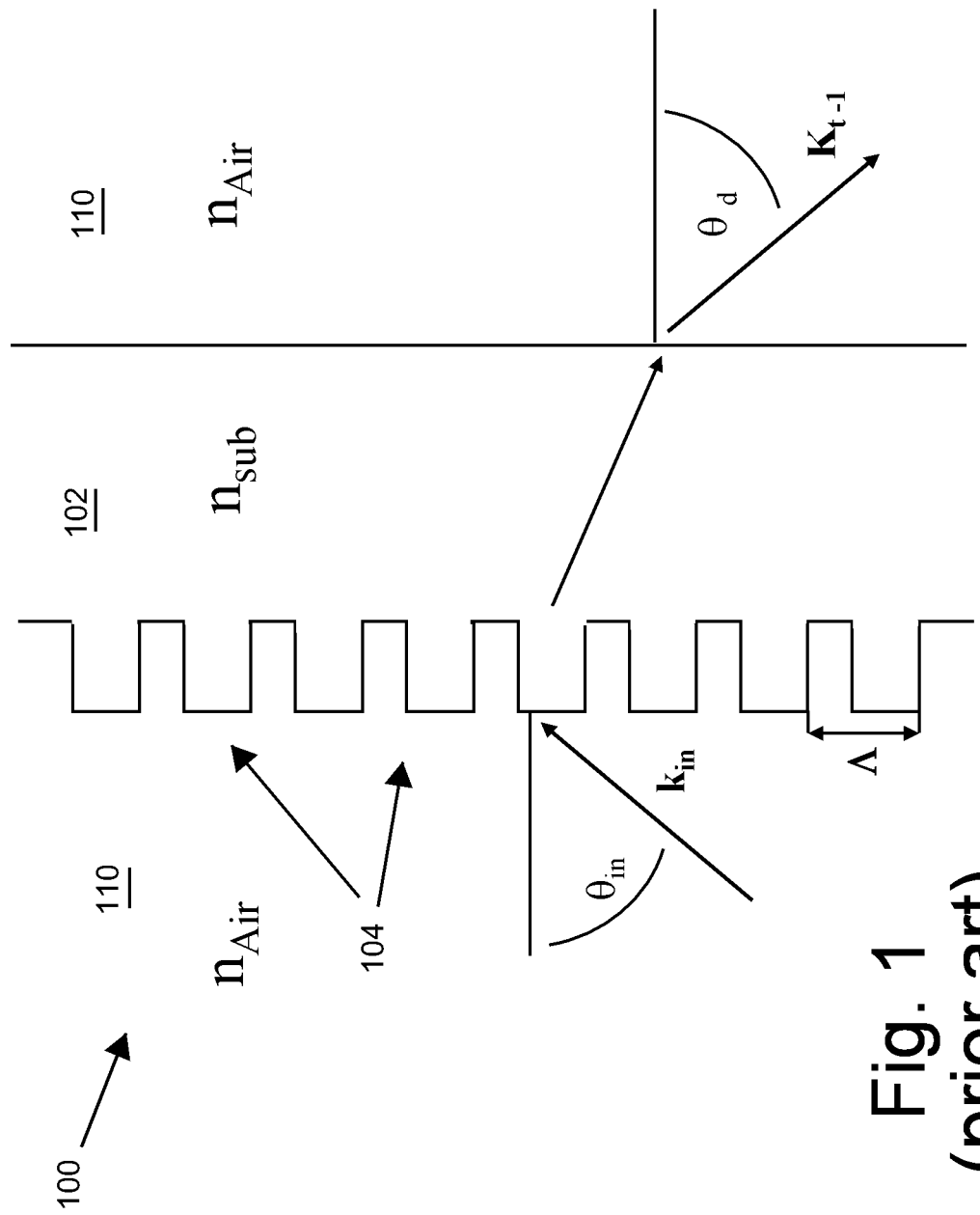
FIG. 1 illustrates schematically operation of a conventional optical diffraction grating, shown diffracting a transmitted optical signal.
Figure 2:
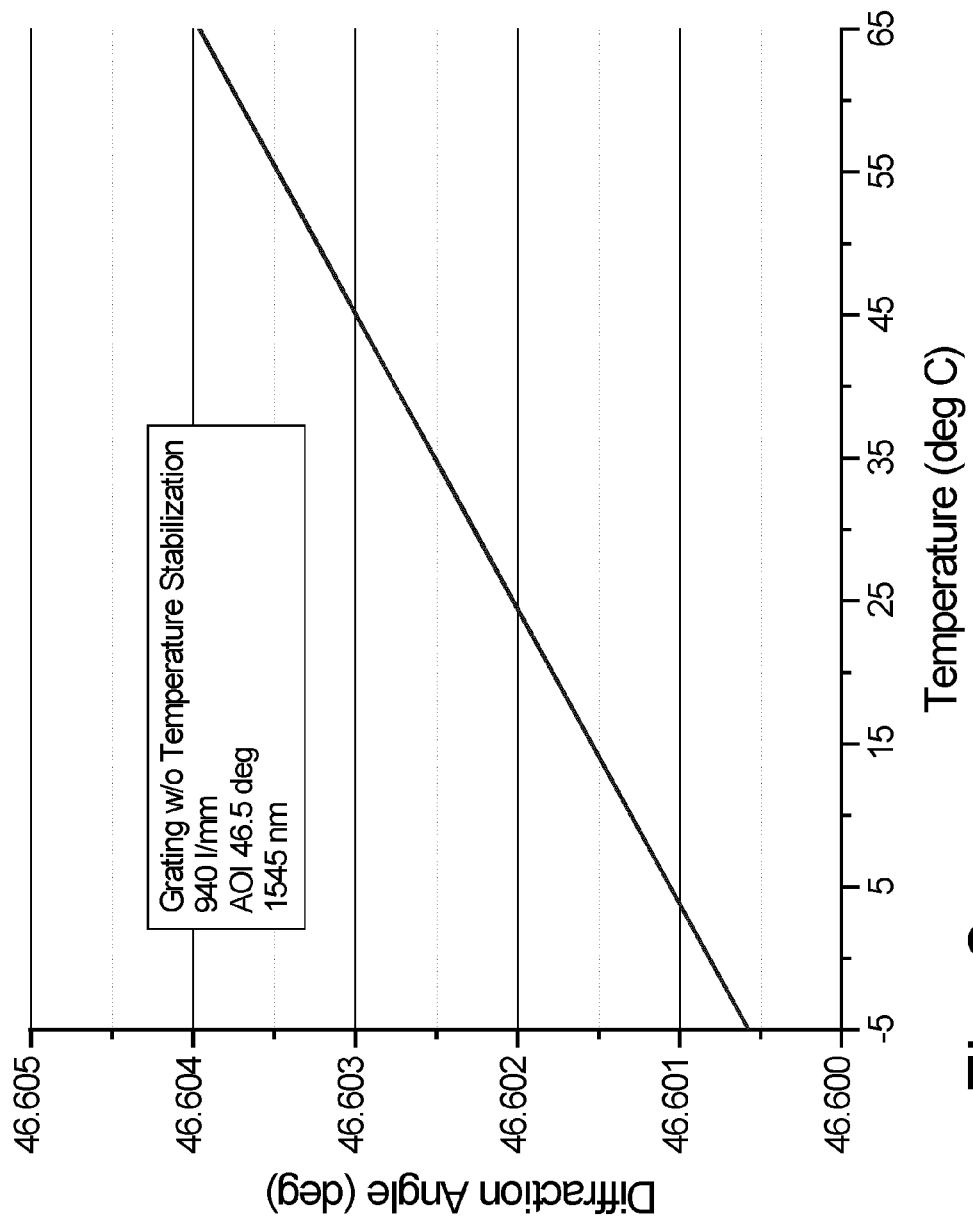
FIG. 2 is a plot of diffraction angle versus temperature for the grating of FIG. 1.

The embodiments shown in the Drawings are exemplary, and should not be construed as limiting the scope of the present disclosure or appended claims. Various dimensions, proportions, or angles shown in the Drawings may be distorted or exaggerated for clarity. If a specific dimension, proportion, or angle is intended, a corresponding value or range of values is given in the Description.

DETAILED DESCRIPTION OF EMBODIMENTS

Figure 3:
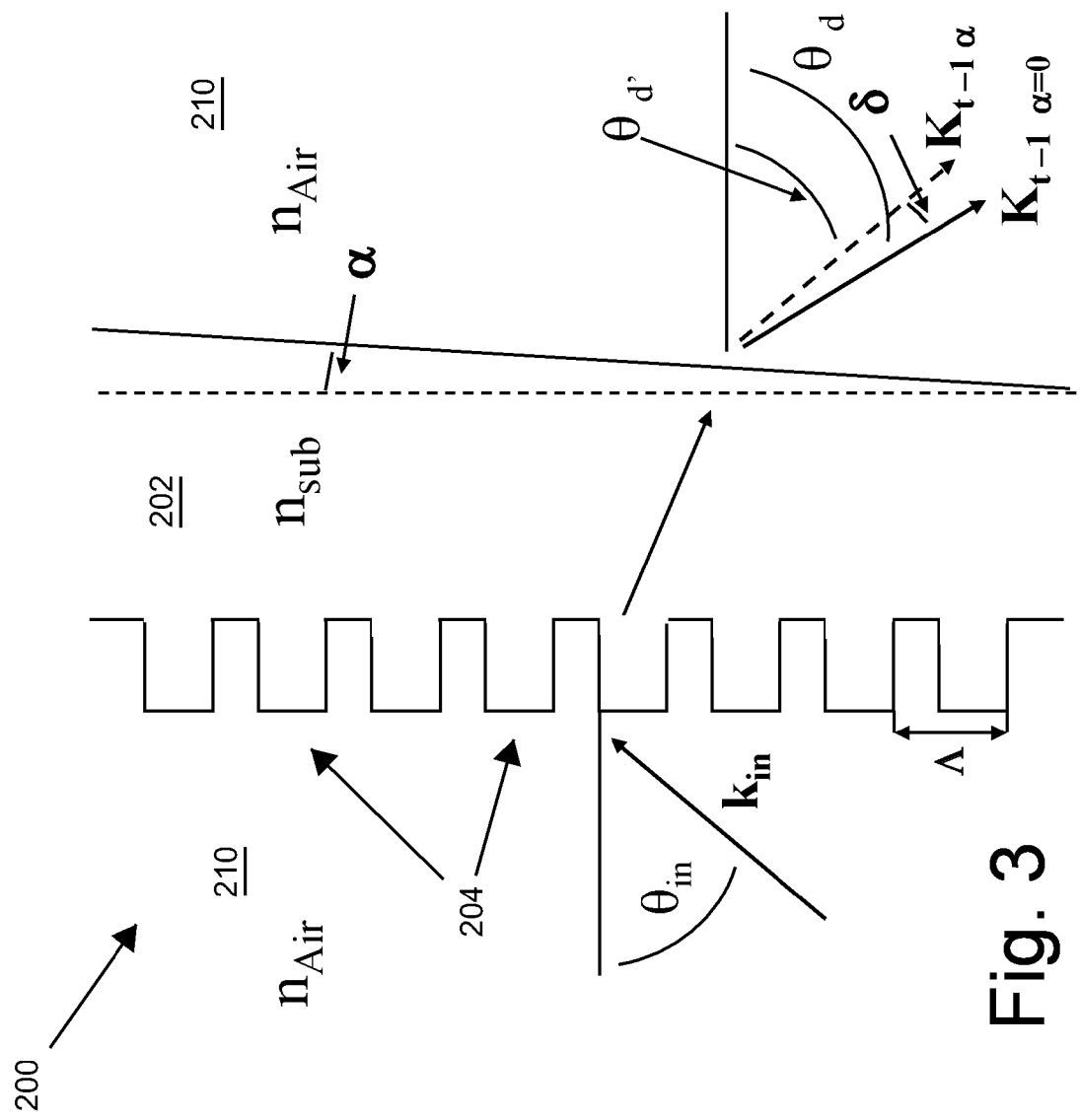
FIG. 3 illustrates schematically operation of an exemplary optical diffraction grating that is thermally compensated according to the present disclosure, shown diffracting a transmitted optical signal.

FIG. 3 illustrates schematically an exemplary optical transmission grating 200 that is thermally compensated according to the present disclosure. The transmission grating 200 comprises a substrate 202 and a set of grating lines 204. The substrate 202 can comprise any suitable material that is substantially transparent over an operational wavelength range that includes a design wavelength λ. One example of a suitable operational wavelength range covers from about 1200 nm to about 1700 nm and is commonly employed in optoelectronic telecommunications applications, and a material commonly employed for that wavelength range is fused silica. A thermally compensated optical transmission grating according to the present disclosure can be employed in any other suitable or desirable operational wavelength range, and any suitable substrate material can be chosen according to the wavelength range.

As described above, the grating lines can comprise periodic surface features (e.g., ridges, grooves, or undulations), periodic variations in substrate composition (e.g., alternating regions of differing materials or composition), or variations in substrate refractive index (e.g., alternating regions of differing material density). Those periodic variations can be imparted on the surface of the substrate 202 or within its volume at some distance from the substrate surface. Whether formed on or in the substrate, the set of grating lines is characterized by a grating spacing Λ. The set of parallel, substantially regularly spaced grating lines 204 are formed in or on the grating substrate 202 so that they are substantially parallel to a first, substantially flat surface of the grating substrate. The set of grating lines 204 therefore forms a substantially flat "grating surface" that is parallel to the first substrate surface, but may or may not coincide with that substrate surface, depending on the nature and location of the grating lines. The grating lines 204 can be formed by any suitable fabrication or replication process, e.g., wet or dry etching, mechanical ruling, lithography or photolithography, direct electron or laser beam writing, holographic photoexposure, stamping, embossing, scribing, or molding.

The grating substrate 202 has a substantially flat second surface opposite the first surface. The first and second substrate surfaces are not parallel, so that they form a dihedral angle α (typically less than about 10°; preferred angle determined based on properties of the substrate material and ambient medium, as described below). Although described as forming a dihedral angle, the first and second substrate surfaces typically do not actually meet at a common edge, but if projected beyond the edge of the substrate would meet at such a common edge. The grating lines 204 are substantially perpendicular to a plane of incidence that is defined by the respective surface-normal vectors of the first and second substrate surfaces.

The substrate 202 can comprise a single, monolithic member that is formed with the non-parallel first and second surfaces. More typically, the grating lines 204 are formed in or on a first substrate member 202a that has parallel first and second surfaces, and a separate, wedge-shaped substrate member 202b is secured to a surface of the substrate member 202a to form the complete substrate 202 (FIG. 6). The wedge-shaped substrate member 202b typically is secured to the second surface of substrate member 202a (i.e., on the surface opposite the gratings lines, as in FIG. 6); the substrate member 202b can be secured on the first surface of substrate member 202a, over the grating lines, if needed or desired. The two substrate members 202a/202b can be secured together in any suitable way to maintain sufficient transparency of substrate 202. Index-matching optical cement or adhesive, or optical contacting of sufficiently flat mating surfaces of substrate members 202a/202b, can be preferred as methods for securing together substrate members 202a and 202b to form substrate 202. The substrate members can comprise the same materials or differing materials. If differing materials are employed, then the refractive index of the substrate member 202a does not influence the diffraction angle or its temperature-dependent behavior. The refractive index of the wedge-shaped substrate member 202b would be used in the analysis disclosed below.

The substrate material has a temperature-dependent refractive index $n_{sub}$ (as noted above, the refractive index of the wedge-shaped substrate member 202b is used for $n_{sub}$, if the substrate 202 comprises members 202a and 202b of differing materials). The transmission grating 200 is immersed in an ambient medium 210 that has a temperature-dependent refractive index $n_{med}$. Air is shown as the ambient medium 210 in the example of FIG. 3, but any suitably transparent solid, liquid, or gaseous medium can be employed. By employing nonparallel first and second substrate surfaces, the temperature-dependent substrate index $n_{sub}$ can be exploited to enable thermal compensation of the temperature-dependent diffraction angle $\theta_d$ discussed above for the conventional grating 100 of FIG. 1. In the exemplary transmission grating 200 of FIG. 3, variation of a diffraction angle $\theta_{d'}$ with temperature, exhibited by the optical transmission grating 200 at the design wavelength $\lambda$ and at a design incidence angle $\theta_{in}$ in the plane of incidence, is less than that variation exhibited by a reference transmission grating that has parallel first and second substrate surfaces but is otherwise identical to the optical transmission grating 200 (i.e., the conventional transmission grating 100 of FIG. 1 would be such a reference transmission grating).

Referring to FIG. 3, the exemplary optical transmission grating 200 is shown that is identical to the conventional transmission grating 100 of FIG. 1, except that the first and second surface of the grating 200 form a dihedral angle $\alpha$. The diffraction angle $\theta_{d'}$ (negative first order) for an incident optical signal with wavevector $k_{in}$ and incidence angle $\theta_{in}$ is given by Eq. 5:

$$\theta_{d'} = \theta_d - \delta, \tag{5}$$

where $\delta$ is an additional angular deflection from $\theta_d$ arising from the angled second surface of the grating substrate. In FIG. 3, zeroth order signals (i.e., specularly reflected and directly transmitted waves), any other transmitted diffracted orders, and any reflected diffracted orders are omitted for clarity. The angular deflection $\delta$ is defined by Eq. 6:

$$\delta = \sin^{-1}((n_{sub}^2/n_{med}^2 - \sin^2\theta_d)^{1/2} \cdot \sin\alpha - \sin\theta_d \cdot \cos\alpha) + \theta_d - \alpha. \tag{6}$$

If $\alpha=0$ in Eq. 6, then $\delta=0$. The angular deflection $\delta$ arising from $\alpha\neq 0$ is temperature dependent through its dependence on: (i) $\theta_d$ (which is temperature dependent, as in Eq. 4), and (ii) the temperature dependent substrate refractive index $n_{sub}$. The latter's temperature dependence is given by Eq. 7:

$$n_{sub}(T) \approx n_{sub}(T_0) + (dn_{sub}/dT) \cdot (T-T_0). \tag{7}$$

For appropriately chosen $\alpha$, $\delta$ can be made to vary with temperature in about equal magnitude but opposite direction as the variation of the diffraction angle $\theta_d$ with temperature. Expressed another way, the temperature dependences of the grating period, refractive index of the ambient medium, and refraction at the angled second substrate surface can combine to cancel out (at least approximately) at a given set of incidence angle and wavelength, thus maintaining the diffraction angle $\theta_{d'}$ substantially independent of temperature. The non-parallel surfaces of the grating substrate 202 act like a prism, deflecting the diffracted optical signal. The temperature dependence of that deflection can at least partly counteract the temperature dependence of the diffraction itself. More generally, the temperature dependence of the diffraction angle $\theta_{d'}$ is given implicitly by Eq. 8:

$$\sin(\theta_{d'} - \alpha) = \sin\theta_d \cos\alpha - \sin\alpha\left(\frac{n_{sub}^2}{n_{med}^2} - (\sin\theta_d)^2\right)^{1/2} \tag{8}$$

or more explicitly dependent on only the operating parameters $\lambda$, $\theta_{in}$, $\Lambda$, $\alpha$, $n_{sub}$, and $n_{med}$ by Eq. 8' (obtained by substituting Eq. 1 into Eq. 8):

$$\theta_{d'} = \tag{8'}$$
$$\alpha - \sin^{-1}\left[\sin\alpha\left(\frac{n_{sub}^2}{n_{med}^2} - \left(\frac{\lambda}{n_{med}\Lambda} - \sin\theta_i\right)^2\right)^{1/2} - \cos\alpha\left(\frac{\lambda}{n_{med}\Lambda} - \sin\theta_i\right)\right].$$

By implicitly differentiating Eq. 8, Eq. 9 is obtained, which defines $d\theta_{d'}/dT$ implicitly:

$$\cos(\theta_{d'} - \alpha)\frac{d\theta_{d'}}{dT} = \cos\alpha\cos\theta_d\frac{d\theta_d}{dT} - \tag{9}$$
$$\frac{\sin\alpha\left(\frac{n_{med}n_{sub}\frac{dn_{sub}}{dT} - n_{sub}^2\frac{dn_{med}}{dT}}{n_{med}^3} - \sin\theta_d\cos\theta_d\frac{d\theta_d}{dT}\right)}{\left(\frac{n_{sub}^2}{n_{med}^2} - (\sin\theta_d)^2\right)^{1/2}}.$$

Either Eq. 8' or Eq. 9 can be used to find an angle $\alpha$ that reduces the temperature dependence of $\theta_{d'}$. While Eqs. 8' and 9 look formidable, in fact all of the quantities on their right-hand sides except the angle $\alpha$ are the known operating parameters $\lambda$, $\theta_{in}$, $\Lambda$, $n_{sub}$, and $n_{med}$ (in Eq. 8'), or can readily calculated from those parameters using Eqs. 1 and 4 (in Eq. 9). To design a optical transmission grating with a reduced temperature dependence of $\theta_{d'}$, $d\theta_{d'}/dT$ can be obtained analytically or numerically from Eq. 8' and set to zero, and the resulting equation solved for the angle α. Alternatively, Eq. 9 can be used to solve for an angle α that yields $d\theta_{d'}/dT=0$. In the event that no such angle α exists, an angle α can be selected that at least reduces or minimizes $d\theta_{d'}/dT$. The resulting optical transmission grating 200 would still exhibit less temperature dependence of the diffraction angle $\theta_{d'}$ than the conventional grating 100 of FIG. 1.

Figure 4:
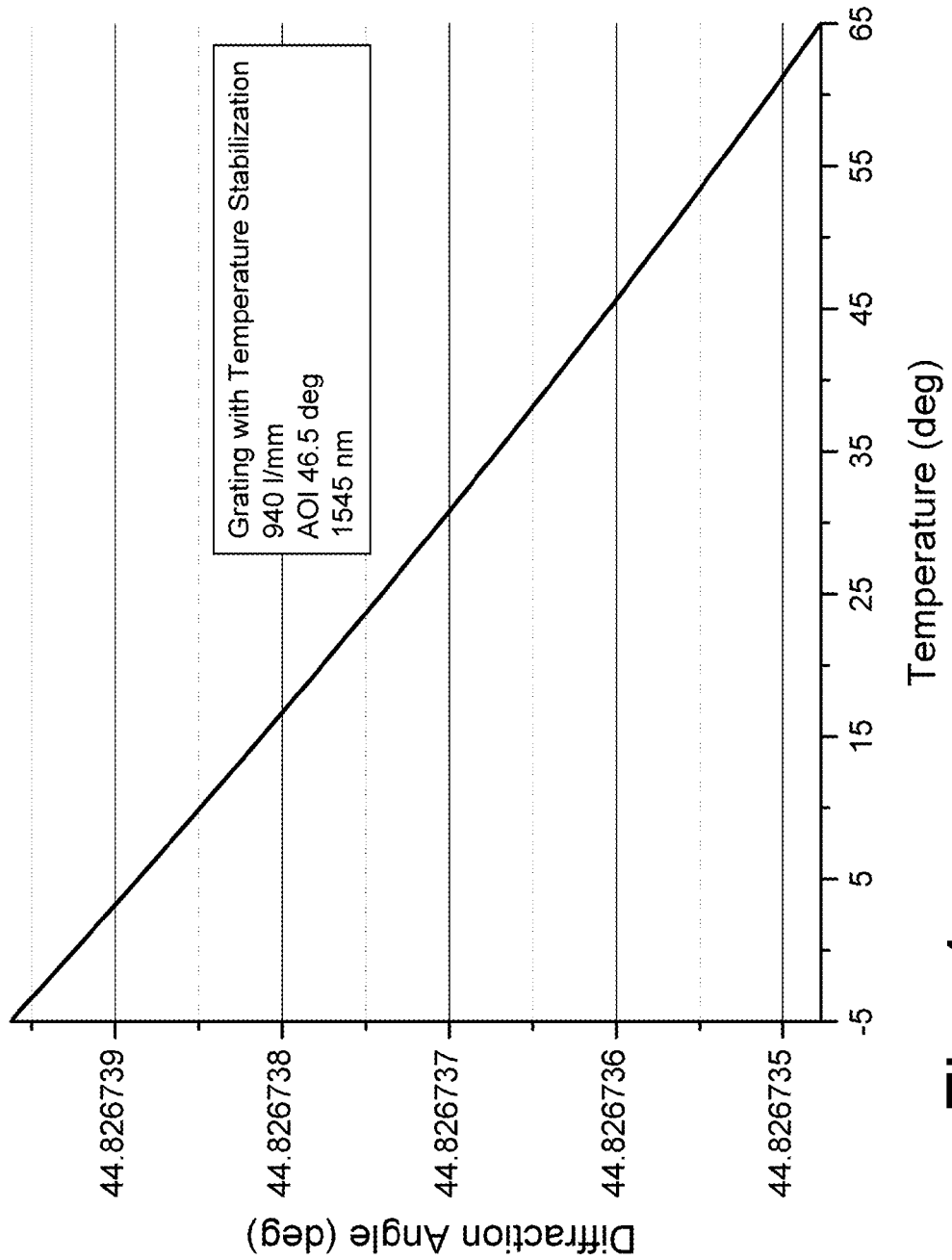
FIG. 4 is a plot of diffraction angle versus temperature for the grating of FIG. 2.

FIG. 4 shows a plot of the diffraction angle $\theta_{d'}$ versus temperature for: α=2.3°, a fused silica grating substrate ($n_{sub}$ ($T_0$=25° C.)=1.444 and $dn/dT$=1.28×10$^{-5}$). Variation of the diffraction angle $\theta_{d'}$ over the entire operational temperature range shown (−5° C. to 65° C. in this example; other suitable operational temperature ranges can be employed) is only 5×10$^{-6}$ degrees, i.e., $d\theta_{d'}/dT \approx 7.1\times10^{-7}$ angular degrees per degree Celsius.

Even if the correct value of α is not calculated, but only approximated, the resulting transmission grating 200 typically will exhibit a temperature dependence for the diffraction angle $\theta_{d'}$ that is substantially reduced relative to that exhibited by the conventional transmission grating 100 of FIG. 1 (i.e., the transmission grating 200 exhibits substantial, but not necessarily complete, thermal compensation). Angles between about 2.0° and about 2.5° appear to yield a derivative $d\theta_{d'}/dT$ less than about 0.000001° per ° C. (i.e., less than 10$^{-6}$ angular degrees per degree Celsius). Likewise, the transmission grating 200 with the angle α between its opposite surfaces will exhibit substantial thermal compensation for incidence angles that deviate from the design incidence angle $\theta_{in}$, or for incident wavelengths that deviate from the design wavelength λ. In addition, a transmission grating 200 that is completely thermally compensated (i.e., the derivative $d\theta_d/dT$ equals zero) for a first combination of design incidence angle and design wavelength can exhibit substantially complete compensation at other combinations of incidence angle and wavelength, governed by Eq. 8' or Eq. 9 with the angle α held constant and the incidence angle and wavelength treated as variables.

Eqs. 8' and 9 can be applied to an optical transmission grating as shown in FIG. 3 whether the incident optical signal is incident on the first surface of the substrate 202 (i.e., the surface with the grating lines; as shown in FIG. 3) or with the incident optical signal incident on the second surface of the substrate 202 (not shown).

Equations analogous to Eqs. 8, 8', or 9 (but more complex) can be readily generated for the more general case of a transmission diffraction grating formed between two wedge-shaped substrate members that are characterized by respective dihedral angles $α_1$ and $α_2$ (which can, but need not, differ) and by respective temperature-dependent refractive indices $n_{sub1}$ and $n_{sub2}$ (which can, but need not, differ). Those wedge-shaped substrate members can meet at the grating lines, or can be secured to opposite surfaces of a grating substrate having parallel surfaces. The use of two wedge-shaped members doubles the number of grating parameters (dihedral angles and thermo-optic coefficients) that can be manipulated or selected for achieving a desired level of thermal compensation. Such a double-wedged transmission diffraction grating shall fall within the scope of the present disclosure or appended claims.

Figure 5:
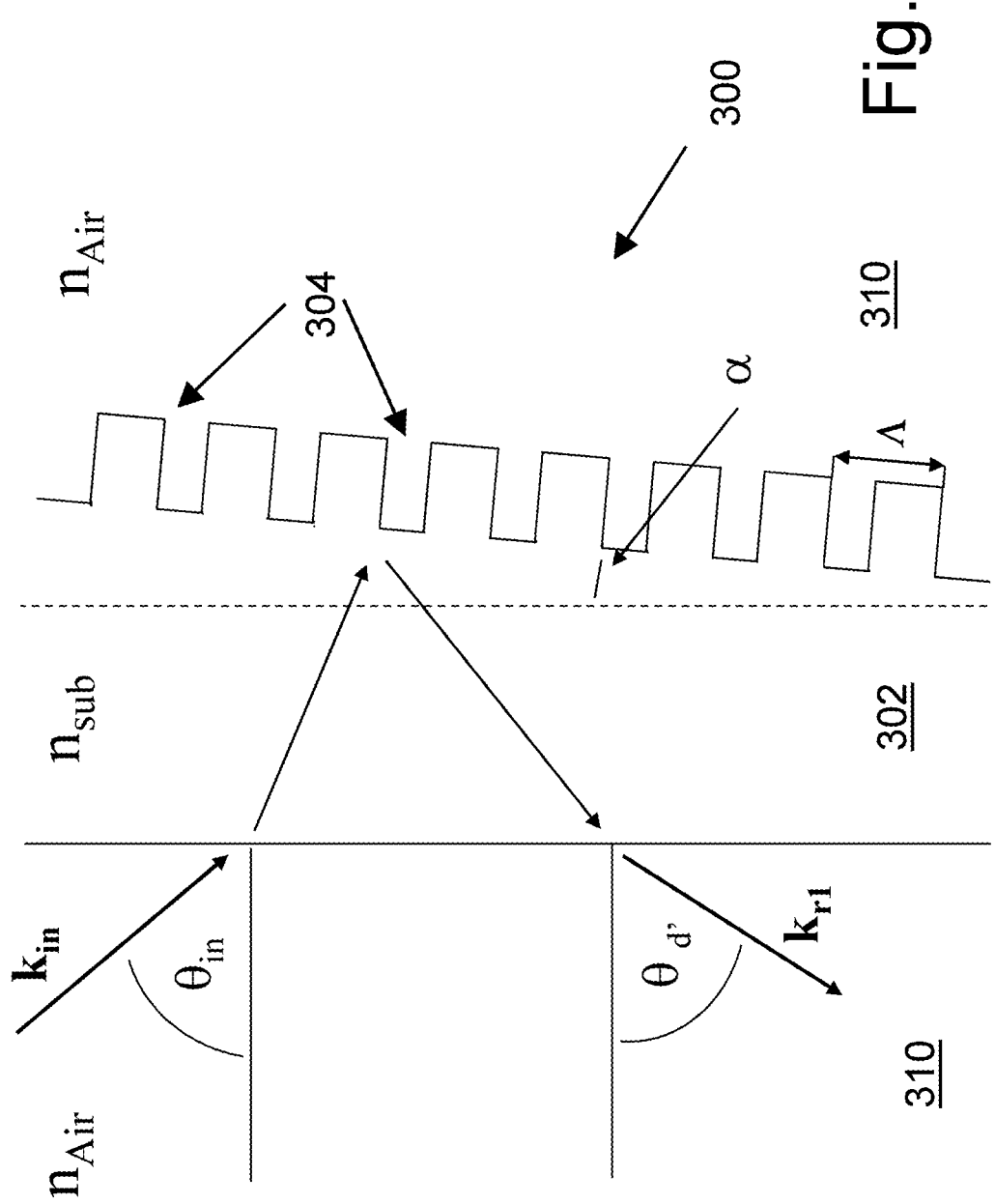
FIG. 5 illustrates schematically operation of an exemplary optical diffraction grating that is thermally compensated according to the present disclosure, shown diffracting a reflected optical signal.

FIG. 5 illustrates schematically an exemplary optical reflection grating 300 that is thermally compensated according to the present disclosure. The reflection grating 300 comprises a substrate 302 and a set of grating lines 304 that are similar in most respects to the transmission grating 200 of FIG. 3, including material(s), formation or construction of the substrate (monolithic or assembled), and form and arrangement of the grating lines (cross sectional shape; spacing). If the substrate 302 comprises first and second substrate members (as described above for the transmission grating 200), the temperature-dependent index of the wedge-shaped substrate member would be used for $n_{sub}$ in the following analysis.

One respect in which the reflection grating 300 typically differs from the transmission grating 200 is enhancement of reflectivity of the first surface of the substrate 302, e.g., by the presence of a metal or dielectric reflective coating (not explicitly shown in FIG. 5). Such a coating would clearly be undesirable for the transmission grating 200, but can serve to increase the diffraction efficiency of the reflection grating 300. The reflective coating can be of any suitable type that imparts increased reflectivity over at least a portion of the operation wavelength range, and can be formed on or applied to the first substrate surface in any suitable way. In some instances, enhance reflectivity can be achieved by total internal reflection.

For achieving thermal compensation of the reflection grating 300, the incident optical signal enters the substrate 302 through its second surface (i.e., the surface opposite the grating lines 304). Because diffraction of light incident on the first surface of the substrate 302 (i.e., referred to as first-surface diffraction) undergoes no refraction at an interface between the substrate 302 and the surrounding medium 310, such refraction cannot be employed to compensate the temperature dependent behavior of the first-surface diffraction from the grating lines 304.

In a manner similar to Eqs. 8, 8', and 9, the temperature dependence of the diffraction angle $\theta_{d'}$ (positive first order reflection; other reflected orders and all transmitted orders, including zeroth order, are omitted for clarity) is given implicitly by Eq. 10, which is similarly complex:

$$\cos\alpha(\sin\theta_i - \sin\theta_{d'}) - \sin\alpha\left(\left(\frac{n_{sub}^2}{n_{med}^2} - (\sin\theta_i)^2\right)^{1/2} + \left(\frac{n_{sub}^2}{n_{med}^2} - (\sin\theta_{d'})^2\right)^{1/2}\right) = \frac{\lambda}{n_{med}\Lambda}. \quad (10)$$

However, just as with Eqs. 8, 8', and 9, all of the quantities except the wedge angle α are known operating parameters λ, $\theta_{in}$, Λ, $n_{sub}$, and $n_{med}$, or can be readily calculated from those parameters using Eqs. 1 and 4. To design an optical reflection grating 300 with a reduced temperature dependence of $\theta_{d'}$; $d\theta_{d'}/dT$ can be obtained analytically or numerically from Eq. 10, and the resulting equation solved for an angle α that yields $d\theta_{d'}/dT=0$. In the event that no such angle α exists, an angle α can be selected that at least reduces or minimizes $d\theta_{d'}/dT$. The resulting optical reflection grating 300 would still exhibit less temperature dependence of the diffraction angle $\theta_{d'}$ than a conventional reflection grating (i.e., a reference grating identical to the grating 300 except that its first and second surfaces are substantially parallel). In addition, a reflection grating 300 that is completely thermally compensated (i.e., the derivative $d\theta_d/dT$ equals zero) for a first combination of design incidence angle and design wavelength can exhibit substantially complete compensation at other combinations of incidence angle and wavelength, governed by Eq. 10 with the angle α held constant and the incidence angle and wavelength treated as variables.

All of the equations disclosed can be modified to describe a thermally compensated optical diffraction grating operating at a higher diffraction order, in reflection or transmission. Such modification of the equations and production of such thermally compensated, higher-order optical diffraction gratings shall fall within the scope of the present disclosure or appended claims.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable combination of disclosed or claimed features (i.e., combinations of features that are not incompatible or mutually exclusive) that appear in the present disclosure or the appended claims, including those combinations of features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

What is claimed is:

1. An optical diffraction grating comprising:
    a grating substrate having substantially flat first and second surfaces, which substrate is substantially transparent over an operational wavelength range that includes a design wavelength $\lambda$, has a temperature-dependent refractive index $n_{sub}$, and is immersed in a medium having a temperature-dependent refractive index $n_{med}$; and
    a set of grating lines formed in or on the substrate that are substantially parallel to the first substrate surface and characterized by a grating spacing $\Lambda$,
    wherein:
    the first and second substrate surfaces are non-parallel and form a dihedral angle $\alpha$;
    the gratings lines are substantially perpendicular to a plane of incidence defined by surface-normal vectors of the first and second substrate surfaces;
    the optical diffraction grating is arranged as a reflection grating arranged to diffract, at a diffraction anile $\theta_{d'}$ with resect to the second surface, at least a portion of an optical signal at the design wavelength $\lambda$ that is incident on the second surface at a design incidence angle $\theta_{in}$ in the plane of incidence, and
    variation of the diffraction angle $\theta_{d'}$ with temperature, exhibited by the optical diffraction grating at the design wavelength $\lambda$ and at the design incidence angle $\theta_{in}$ in the plane of incidence, is less than that variation exhibited by a reference diffraction grating that has parallel first and second substrate surfaces but is otherwise identical to the optical diffraction grating.

2. The optical diffraction grating of claim 1 wherein the grating substrate comprises first and second grating substrate members, the first grating substrate member has substantially parallel first and second surfaces and the set of grating lines formed on its first surface, the second substrate member has non-parallel first and second surfaces that form the dihedral angle $\alpha$, the first and second substrate members are assembled with one surface of the first substrate member against one surface of the second substrate member, and the temperature-dependent refractive index $n_{sub}$ is the refractive index of the second substrate member.

3. The diffraction grating of claim 1 wherein the angle $\alpha$ results in a first derivative of diffraction angle $\theta_{d'}$ with respect to temperature that is less than about $0.000001°$ per $°$ C. at a design temperature $T_0$, the design wavelength $\lambda$, and the design incidence angle $\theta_{in}$.

4. The diffraction grating of claim 1 wherein the variation of a diffraction angle $\theta_{d'}$ with temperature, exhibited by the optical diffraction grating at the design wavelength $\lambda$ and at a design incidence angle $\theta_{in}$ in the plane of incidence, is less than about $0.00001°$ over an operational temperature range.

5. The diffraction grating of claim 1 wherein the grating substrate comprises fused silica, the medium comprises ambient air, and the angle $\alpha$ is between about $2.0°$ and about $2.5°$.

6. The diffraction grating of claim 1 wherein the grating substrate comprises fused silica, the medium comprises ambient air, the angle $\alpha$ is between about $2.0°$ and about $2.5°$, the grating spacing is between about 800 nm and about 2000 nm, and the operational wavelength range is between about 1200 nm and about 1700 nm.

7. A method comprising:
    forming a grating substrate having substantially flat first and second surfaces, which substrate is substantially transparent over an operational wavelength range that includes a design wavelength $\lambda$, has a temperature-dependent refractive index $n_{sub}$, and is immersed in a medium having a temperature-dependent refractive index $n_{med}$; and
    forming a set of grating lines in or on the substrate that are substantially parallel to the first substrate surface and characterized by a grating spacing $\Lambda$,
    wherein:
    the first and second substrate surfaces are non-parallel and form a dihedral angle $\alpha$;
    the gratings lines are substantially perpendicular to a plane of incidence defined by surface-normal vectors of the first and second substrate surfaces;
    the optical diffraction grating is arranged as a reflection grating arranged to diffract, at a diffraction angle $\theta_{d'}$ with respect to the second surface, at least a portion of an optical signal at the design wavelength λ that is incident on the second surface at a design incidence angle $θ_{in}$ in the plane of incidence, and variation of the diffraction angle $θ_{d'}$ with temperature, exhibited by the optical diffraction grating at the design wavelength λ and at the design incidence angle $θ_{in}$ in the plane of incidence, is less than that variation exhibited by a reference diffraction grating that has parallel first and second substrate surfaces but is otherwise identical to the optical diffraction grating.

8. The method of claim 7 wherein the grating substrate comprises first and second grating substrate members, the first grating substrate member has substantially parallel first and second surfaces and the set of grating lines formed on its first surface, the second substrate member has non-parallel first and second surfaces that form the dihedral angle α, the first and second substrate members are assembled with one surface of the first substrate member against one surface of the second substrate member, and the temperature-dependent refractive index $n_{sub}$ is the refractive index of the second substrate member.

9. The method of claim 7 wherein the angle α results in a first derivative of diffraction angle $θ_{d'}$ with respect to temperature that is less than about 0.000001° per °C. at a design temperature $T_0$, the design wavelength λ, and the design incidence angle $θ_{in}$.

10. The method of claim 7 wherein the variation of a diffraction angle $θ_{d'}$ with temperature, exhibited by the optical diffraction grating at the design wavelength λ and at a design incidence angle $θ_{in}$ in the plane of incidence, is less than about 0.00001° over an operational temperature range.

11. The method of claim 7 wherein the grating substrate comprises fused silica, the medium comprises ambient air, and the angle α is between about 2.0° and about 2.5°.

12. The method of claim 7 wherein the grating substrate comprises fused silica, the medium comprises ambient air, the angle α is between about 2.0° and about 2.5°, the grating spacing is between about 800 nm and about 2000 nm, and the operational wavelength range is between about 1200 nm and about 1700 nm.

13. A method comprising directing an input optical signal onto an optical diffraction grating at a design incidence angle $θ_{in}$ so that a portion of the input optical signal is diffracted as an output optical signal at a diffraction angle $θ_{d'}$, wherein:

the optical diffraction grating comprises (i) a grating substrate having substantially flat first and second surfaces, which substrate is substantially transparent over an operational wavelength range that includes a design wavelength λ, has a temperature-dependent refractive index $n_{sub}$, and is immersed in a medium having a temperature-dependent refractive index $n_{med}$, and (ii) a set of grating lines formed in or on the substrate that are substantially parallel to the first substrate surface and characterized by a grating spacing Λ;

the first and second substrate surfaces are non-parallel and form a dihedral angle α;

the gratings lines are substantially perpendicular to a plane of incidence defined by surface-normal vectors of the first and second substrate surfaces;

the input optical signal is incident on the second surface at the design incidence angle $θ_{in}$;

the optical diffraction grating is arranged as a reflection grating arranged to diffract, at the diffraction anile $θ_{d'}$ with resect to the second surface, at least a portion of the optical signal at the design wavelength λ that is incident on the second surface at the design incidence angle $θ_{in}$ in the plane of incidence, and variation of the diffraction angle $θ_{d'}$ with temperature, exhibited by the optical diffraction grating at the design wavelength λ and at the design incidence angle $θ_{in}$ in the plane of incidence, is less than that variation exhibited by a reference diffraction grating that has parallel first and second substrate surfaces but is otherwise identical to the optical diffraction grating.

14. The method of claim 13 wherein the grating substrate comprises first and second grating substrate members, the first grating substrate member has substantially parallel first and second surfaces and the set of grating lines formed on its first surface, the second substrate member has non-parallel first and second surfaces that form the dihedral angle α, the first and second substrate members are assembled with one surface of the first substrate member against one surface of the second substrate member, and the temperature-dependent refractive index $n_{sub}$ is the refractive index of the second substrate member.

15. The method of claim 13 wherein the angle α results in a first derivative of diffraction angle $θ_{d'}$ with respect to temperature that is less than about 0.000001° per °C. at a design temperature $T_0$, the design wavelength λ, and the design incidence angle $θ_{in}$.

16. The method of claim 13 wherein the variation of a diffraction angle $θ_{d'}$ with temperature, exhibited by the optical diffraction grating at the design wavelength λ and at a design incidence angle $θ_{in}$ in the plane of incidence, is less than about 0.00001° over an operational temperature range.

17. The method of claim 13 wherein the grating substrate comprises fused silica, the medium comprises ambient air, and the angle α is between about 2.0° and about 2.5°.

18. The method of claim 13 wherein the grating substrate comprises fused silica, the medium comprises ambient air, the angle α is between about 2.0° and about 2.5°, the grating spacing is between about 800 nm and about 2000 nm, and the operational wavelength range is between about 1200 nm and about 1700 nm.

* * * * *